United States Patent
Witt et al.

(10) Patent No.: US 12,224,625 B2
(45) Date of Patent: Feb. 11, 2025

(54) ROTOR FOR AN AXIAL FLUX MACHINE, METHOD FOR PRODUCING A ROTOR FOR AN AXIAL FLUX MACHINE AND AXIAL FLUX MACHINE

(71) Applicant: Schaeffler Technologies AG & Co. KG, Herzogenaurach (DE)

(72) Inventors: Holger Witt, Bühl (DE); Matthias Gramann, Renchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 306 days.

(21) Appl. No.: 17/911,447

(22) PCT Filed: Feb. 25, 2021

(86) PCT No.: PCT/DE2021/100188
§ 371 (c)(1),
(2) Date: Sep. 14, 2022

(87) PCT Pub. No.: WO2021/185403
PCT Pub. Date: Sep. 23, 2021

(65) Prior Publication Data
US 2023/0094571 A1    Mar. 30, 2023

(30) Foreign Application Priority Data
Mar. 16, 2020    (DE) .................. 102020107162.0

(51) Int. Cl.
*H02K 21/24*    (2006.01)
*H02K 1/2798*    (2022.01)
*H02K 15/03*    (2006.01)

(52) U.S. Cl.
CPC ........... *H02K 1/2798* (2022.01); *H02K 15/03* (2013.01); *H02K 21/24* (2013.01)

(58) Field of Classification Search
CPC .. H02K 1/2793; H02K 1/2795; H02K 1/2798; H02K 1/28; H02K 1/30; H02K 15/03; H02K 21/24
See application file for complete search history.

(56) References Cited

U.S. PATENT DOCUMENTS

2005/0194855 A1*  9/2005  Hasebe ............... H02K 1/2796
                                              310/156.43
2011/0148224 A1*  6/2011  Tokoi ................. H02K 1/2796
                                              310/43

(Continued)

FOREIGN PATENT DOCUMENTS

DE    102004038884    5/2005
DE    102005053119    5/2007

(Continued)

OTHER PUBLICATIONS

WO-2019110173-A1—Machine Translation (Year: 2019).*

*Primary Examiner* — Tran N Nguyen
*Assistant Examiner* — Masoud Vaziri
(74) *Attorney, Agent, or Firm* — Volpe Koenig (57) ABSTRACT

A rotor (1) for an electrical axial flux machine (2) that can be operated as a motor and/or generator. The rotor includes a support (3), a plurality of magnet elements (4) arranged against, on, or in the support (3) and running radially from the interior outwards, the magnet elements (4) being magnetized in a circumferential direction and being arranged individually or in groups in series around the circumference with alternating opposing magnetization directions, and a plurality of flux conduction elements (5) which conduct the magnetic flux and are arranged against, on, or in the support (3) and around the circumference, between the magnet elements (4). A flux distributing element (6) which distributes the magnetic flux is arranged between at least one of the magnet elements (4) and a flux conduction element (5) that (Continued)

is arranged adjacently thereto in the circumferential direction.

13 Claims, 4 Drawing Sheets

(56) References Cited

U.S. PATENT DOCUMENTS

| | | | |
|---|---|---|---|
| 2011/0260566 A1* | 10/2011 | Odvarka | H02K 1/2796 29/598 |
| 2023/0051582 A1* | 2/2023 | Witt | H02K 15/03 |

FOREIGN PATENT DOCUMENTS

| | | |
|---|---|---|
| DE | 102013218829 | 3/2015 |
| DE | 102015208281 | 11/2016 |
| DE | 102017204434 | 9/2018 |
| DE | 102017127157 | 5/2019 |
| WO | 2010061200 | 6/2010 |
| WO | 2018015923 | 1/2018 |
| WO | 2019110173 | 6/2019 |
| WO | WO-2019110173 A1 * | 6/2019 |

* cited by examiner

ROTOR FOR AN AXIAL FLUX MACHINE, METHOD FOR PRODUCING A ROTOR FOR AN AXIAL FLUX MACHINE AND AXIAL FLUX MACHINE

CROSS-REFERENCE TO RELATED APPLICATIONS

This application is the U.S. National Phase of PCT Appln. No. PCT/DE2021/100188, filed Feb. 25, 2021, which claims the benefit of German Patent Appln. No. 10 2020 107 162.0, filed Mar. 16, 2020, the entire disclosures of which are incorporated by reference herein.

TECHNICAL FIELD

The present disclosure relates to a rotor for an electrical axial flux machine that can be operated as a motor and/or generator. The axial flux machine comprises a support, a plurality of magnet elements arranged against, on, or in the support and running radially from the interior outwards, and a plurality of flux conduction elements which conduct the magnetic flux and are arranged against, on, or in the support and around the circumference, between the magnet elements. The magnet elements of the axial flux machine are magnetized in a circumferential direction and arranged individually or in groups in series around the circumference with alternating opposing magnetization directions.

BACKGROUND

A rotor for an axial flux machine is already known from DE 10 2013 218 829 A1. With this rotor, a kind of frame is formed by the rotor laminations, in which inlays are integrated. The rotor laminations have individual punch-outs for both the magnets and the inlays.

Other setups of rotors for axial flux machines or of axial flux machines themselves are described by DE 10 2017 204 434 A1, DE 10 2005 053 119 A1, DE 10 2004 038 884 A1, DE 10 2015 208 281 A1, DE 10 2017127 157 A1 or WO 2018/015293 A1, among others.

The magnetic flux in an electric motor designed as an axial flux motor is axially directed in the air gap between the stator and the rotor. A laminated rotor for high speeds and frequencies is designed to be layered in the axial direction. For the axial magnetic flux, soft magnetic composite material—also referred to as SMC material (soft magnetic components, soft magnetic compounds/soft magnetic powder)—is often used as the material for flux conduction elements, since in this case a three-dimensional propagation of the magnetic flux is possible without significant eddy currents. For smaller rotors, a homogeneous SMC rotor is possible as long as the mechanical load does not exceed the low strength of the SMC. The SMC material is usually made of high purity iron powder, which has a special surface coating on each particle. The electrically insulating surface thus realized ensures high electrical resistance, which is retained even after pressing and heat treatment. Eddy current losses are therefore practically negligible.

SUMMARY

It is an object of the disclosure to provide a rotor for an electrical axial flux machine, a method for producing a rotor for an electrical axial flux machine, and an electrical axial flux machine, whereby the amount of soft magnetic composite material required can be reduced.

This object is achieved by a rotor with one or more of the features disclosed herein, by a method for producing a rotor with one or more of these features, and by an axial flux machine with one or more of these features.

A rotor for an electrical axial flux machine that can be operated as a motor and/or generator according to the disclosure comprises a support, a plurality of magnet elements arranged against, on, or in the support and running substantially radially from the interior outwards, and a plurality of flux conduction elements which conduct the magnetic flux and are arranged against, on, or in the support and around the circumference, between the magnet elements. The magnet elements of the axial flux machine are magnetized in a circumferential direction and arranged individually or in groups in series around the circumference with alternating opposing magnetization directions. According to the disclosure, a flux distributing element which distributes the magnetic flux, preferably spatially distributes it, is arranged between at least one of the magnet elements and a flux conduction element that is arranged adjacently thereto in the circumferential direction. This provides the advantage that low-cost material for flux conduction elements can be used to form the rotor magnet for an axial flux machine, and a higher quality and more expensive material for the transition area between magnet elements and flux conduction elements only has to be introduced at selected points on the rotor. The design of the rotor according to the disclosure ensures the three-dimensional distribution of the magnetic flux from the magnet elements to the air gap and reduces the amount of soft magnetic composite material required.

In the context of the disclosure, the directional indication "substantially radially" is understood to mean that the magnet elements and/or the flux conduction elements and/or the flux distributing elements arranged in, against or on the support can run exactly radially from the interior outwards, wherein the center axes of their respective longitudinal extent would also be formed running through the central rotor rotation axis. However, also included in the context of the disclosure are those arrangements in which the center axes of the magnet elements, flux conduction elements or flux distributing elements arranged in, against or on the support are arranged to run at an angle, so that their center axes no longer intersect the central rotor rotation axis, but are aligned slightly tilted and run slightly next to the central rotor rotation axis.

In the context of the disclosure, a group of magnet elements comprises at least two magnet elements arranged adjacently around the circumference, each having the same circumferential magnetization direction.

In the context of the disclosure, magnetized in the circumferential direction means that the magnet elements or the groups of magnet elements are formed and distributed around the circumference in such a manner that the orientation of their magnetic field is not in the axial or radial direction, but rather in the circumferential direction. These directional indications are rather to be understood as rough directions (in contrast to the axial direction as a direction in or parallel to the rotor rotation axis and to the radial direction as a direction substantially perpendicular to the rotor rotation axis). The magnetic field emitted by the magnet elements is determined by magnetic field vectors, which are directed tangentially in the circumferential direction or deviate from it by a scattering range. The scattering range is preferably given as about plus/minus 20 angular degrees—particularly preferably estimated at about plus/minus 15 angular degrees.

Among the above-mentioned different alternatives of "against" or "on" or "in" the support, the following embodiments are meant by way of example:

"against": The support consists, for example, of an inner hub body, wherein the magnet elements and flux conduction elements are mounted radially outwardly on the hub body and or are held radially on the hub body, for example, by means of a ring.

"on": The support has a disc-shaped region or radially projecting struts or other support elements projecting radially from the interior outwards, on which or between which the magnetically active components are attached (e.g., by bonding and/or a circumferential annular hoop band).

"in": The support and magnetic conduction elements are arranged similarly to the figures pertaining to the exemplary embodiments of the present disclosure.

An axial flux machine in the context of the disclosure is characterized in that the magnetic flux generated in the air gap between the rotor and the stator runs in the axial direction parallel to the rotor rotation axis of the electric machine. In other words, the air gap expands or its plane extends in a plane formed perpendicular to the rotation axis of the rotor.

The magnetic flux conduction material is preferably formed of iron powder or a mixture with iron powder. The SMC material described above is particularly preferred.

In a particularly preferred embodiment of the support, the support has an inner ring designed as a support hub, via which the rotor can be connected in a nonrotatable manner to a shaft, and a support outer ring, which limits the rotor outward in the radial direction. Between the support hub and the support outer ring, the support can have a support disc in the form of a base part, by means of which the support hub and the support outer ring are connected to one another and which, together with the radial outer ring surface of the support hub and the radial inner ring surface of the support outer ring, forms a receiving space open in the direction of the air gap for receiving the magnet elements and the flux conduction elements of the rotor.

It is also possible to design the support as a hub construction, which extends to the inner radius of the magnetic circuit and which is equipped with attached permanent magnets and flux conduction pieces. An annular hoop band then holds the attached magnet elements and flux conduction elements in position.

In another embodiment of a support, a support is provided without an outer ring and/or without a base part. The magnet elements as well as the flux conduction elements can be held radially inward by bonding them to the support. As an alternative or in addition to bonding, the magnet elements and the flux conduction elements can also be fixed mechanically using claw elements, which are then supported by means of struts on the inner hub-like support body.

According to an advantageous embodiment, it can be provided that the or each flux distributing element has a triangular cross-section as seen in a sectional plane perpendicular to the rotor rotation axis, wherein the flux distributing element rests with its triangle base side in each case against an adjacent magnet element and wherein it is arranged in magnetically conductive contact with the adjacently arranged flux conduction element with the two remaining leg sides. The advantage of this design is that this geometry, which is easy to implement in terms of the manufacturing process, ensures an approximately optimum flux distribution between the magnet elements and the flux conduction elements.

According to a further preferred further development, it can also be provided that the or each flux distributing element has the cross-section of an acute-angled triangle (e.g. wedge-shaped) as seen in a sectional plane perpendicular to the rotor rotation axis, wherein the flux distributing element rests with its short triangle base side g against the inner surface of the support outer ring and with its remaining triangle legs in each case with one of the triangle legs against an adjacent magnet element and with the other triangle leg against the flux conduction element. The flux distributing elements ensure a largely uniformly distributed magnetic flux density in the air gap by directing or distributing a part of the magnetic flux of the radially more inner magnet elements to the radially more outer regions of the air gap.

As an alternative to the triangular shape, the flux conduction elements can also be designed in the form of a parabola as seen in cross-section. Although this would be somewhat more expensive in terms of the manufacturing process, it could additionally save on expensive soft magnetic composite material compared to the triangular shape.

Furthermore, according to an additional advantageous, it can be provided that the or each flux distributing element has a rectangular cross-section as seen in a sectional plane perpendicular to the rotor rotation axis, which can further simplify the production and assembly of the rotor.

According to another particularly preferred embodiment, it can be provided that the or each flux distributing element has the same axial depth over the entire radial extent. This design also further supports the possibility of using common parts as well as further simplifying the assembly of the rotor.

Furthermore, the disclosure can also be further developed in that at least one of the flux distributing elements is formed substantially entirely of a soft magnetic composite material or ferrite material, thereby optimizing the flux conduction properties of the flux distributing element.

In an additional preferred embodiment, it can also be provided that at least one of the flux conduction elements is designed in the form of a stack of laminated sheets, in particular is formed from electrical sheets. Preferably, the sheets are designed such that the flux conduction element has the same axial depth over its entire radial extent. This ensures an optimized design of the flux conduction elements in terms of material costs and production.

It can also be advantageous in a further development in that the magnet elements are designed as permanent magnets and are advantageously formed from a plurality of individual magnets electrically insulated from one another and in particular have the same axial depth over the entire radial extent. This design of the magnet elements allows for the use of standardized common parts and ensures a simple assembly.

In a particularly preferred embodiment, the support has a support hub designed to be annular in shape, a support disc designed to be annular in shape and a support outer ring outwardly radially delimiting the support. In this case, an annular pot-like receiving region with a pot base formed by the support disc is formed between the support hub and the support outer ring for receiving the magnet elements, the flux conduction elements and the flux distributing elements. This ensures that an easily equippable rotor support with high mechanical strength is provided.

Finally, the disclosure can also be advantageously implemented in that the support hub has a polygonal cross-sectional shape (sectional plane perpendicular to the rotor rotation axis) on its radial outer ring surface and/or the support outer ring has a polygonal cross-sectional shape on its radial inner ring surface. On the one hand, this provides an assembly aid when equipping the rotor support and, on the other, ensures high strength of the entire rotor with regard to acting torques.

Furthermore, the object of the disclosure is achieved by a method for producing a rotor constructed with one or more of the features provided herein, comprising the following method steps: Providing a support, providing magnet elements and introducing the magnet elements against, on, or in the support; providing flux conduction elements and introducing the flux conduction elements against, on, or in the support; as well as providing flux distributing elements and introducing the flux distributing elements against, on, or in the support. In a particularly preferred embodiment, in a further method step, the elements arranged against, on, or in the support are secured by a circumferential annular hoop band.

Furthermore, the object of the disclosure is achieved by an axial flux machine with a stator and a rotor with one or more of the features disclosed herein.

BRIEF DESCRIPTION OF THE DRAWINGS

In the following, the disclosure will be explained in more detail with reference to figures without limiting the general idea of the disclosure.

In the figures.

DETAILED DESCRIPTION

Figure 1:
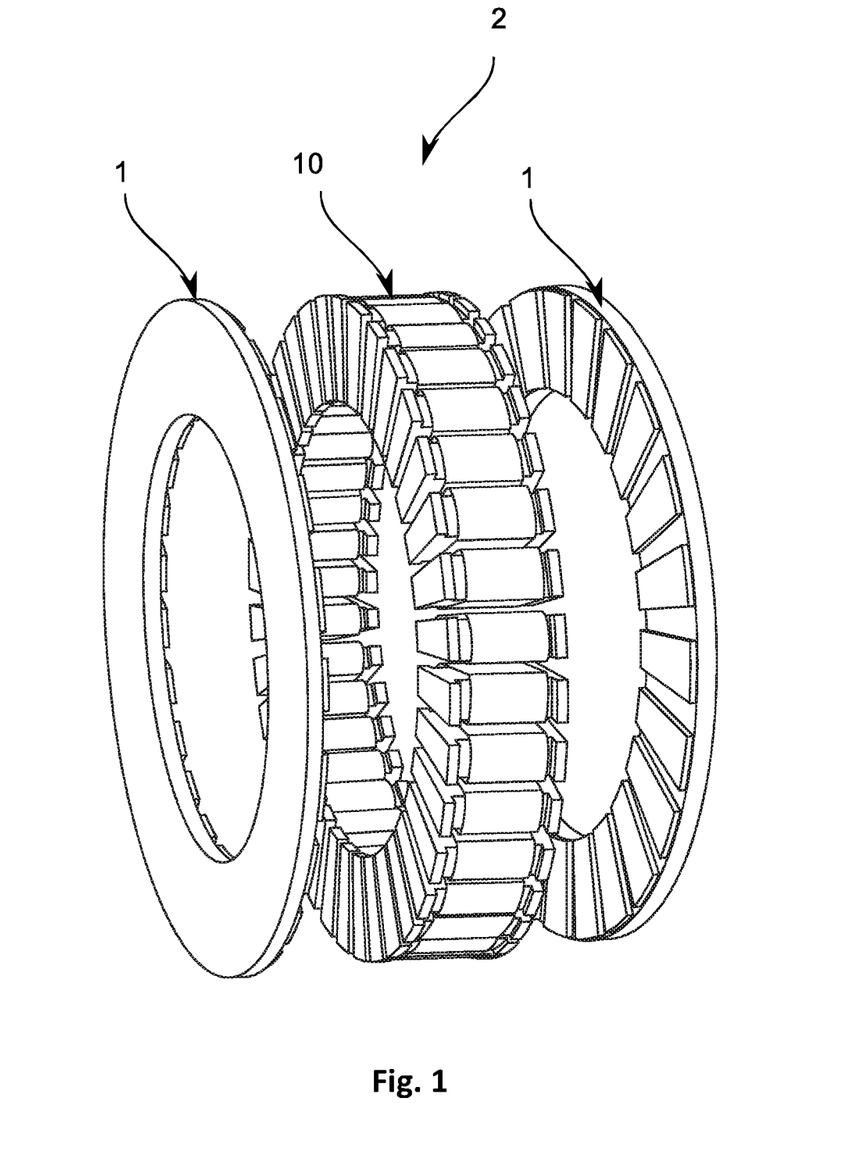
FIG. 1 shows an axial flux machine according to the prior art in a schematic perspective view.

FIG. 1 shows an axial flux machine 2 according to the prior art in a schematic perspective view. The axial flux machine 2 shown comprises a central stator 10 and two rotors 1 spaced apart on either side by a respective air gap.

Figure 2:
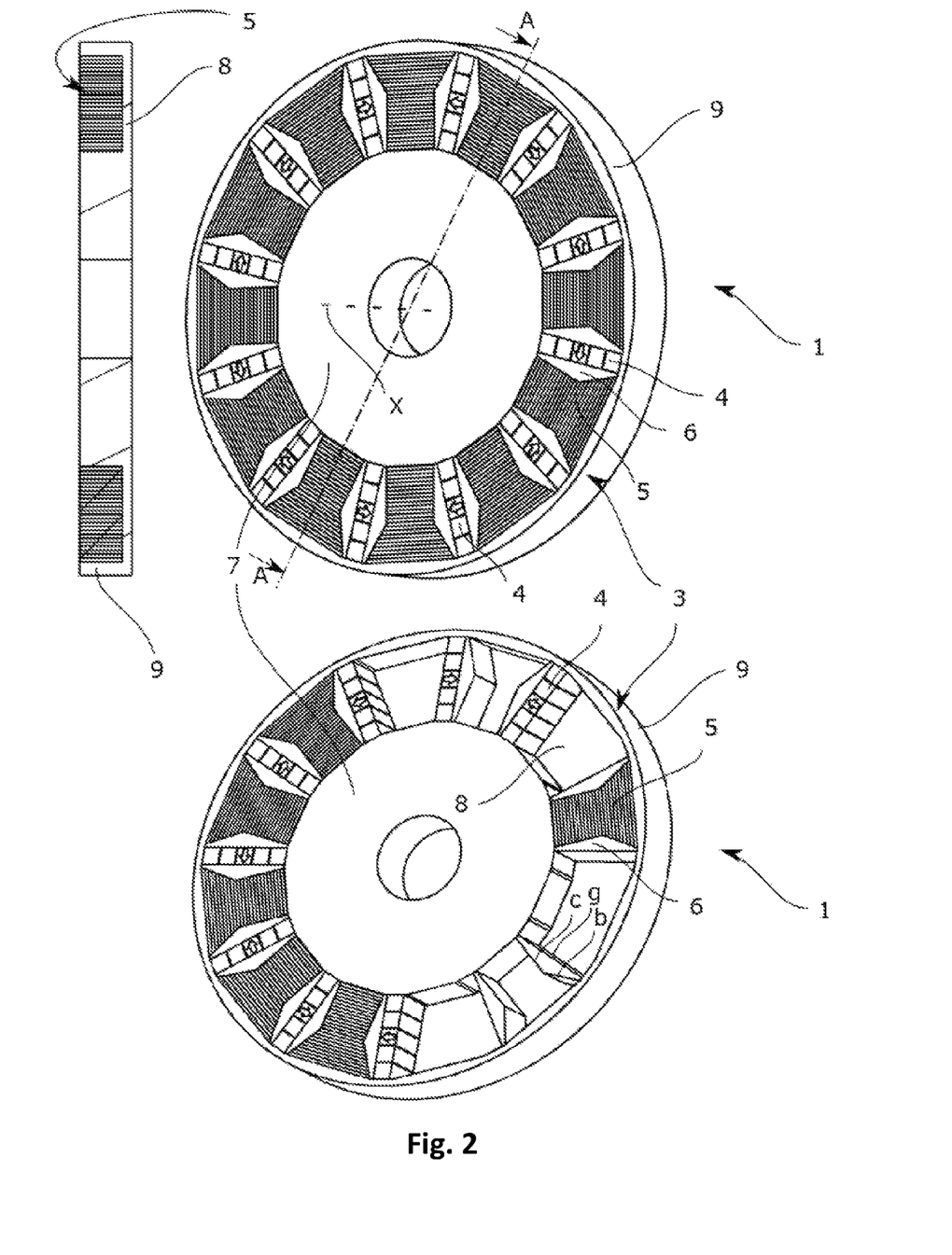
FIG. 2 shows the rotor according to the disclosure in a possible embodiment in different views—in the top left in a sectional view along the section line A-A of the perspective view shown in the top right and at the bottom a perspective view of the rotor, wherein it is only partially equipped with magnet elements, flux conduction elements and flux distributing elements.

FIG. 2 shows the rotor 1 constructed according to the disclosure in a possible embodiment in different views. In the top left, the rotor 1 is shown in a sectional view along the section line A-A of the perspective view of the fully equipped rotor 1 shown in the top right. At the bottom, the rotor 1 is shown in another perspective view, wherein it is only partially equipped with magnet elements 4, flux conduction elements 5 and flux distributing elements 6.

Figure 3:
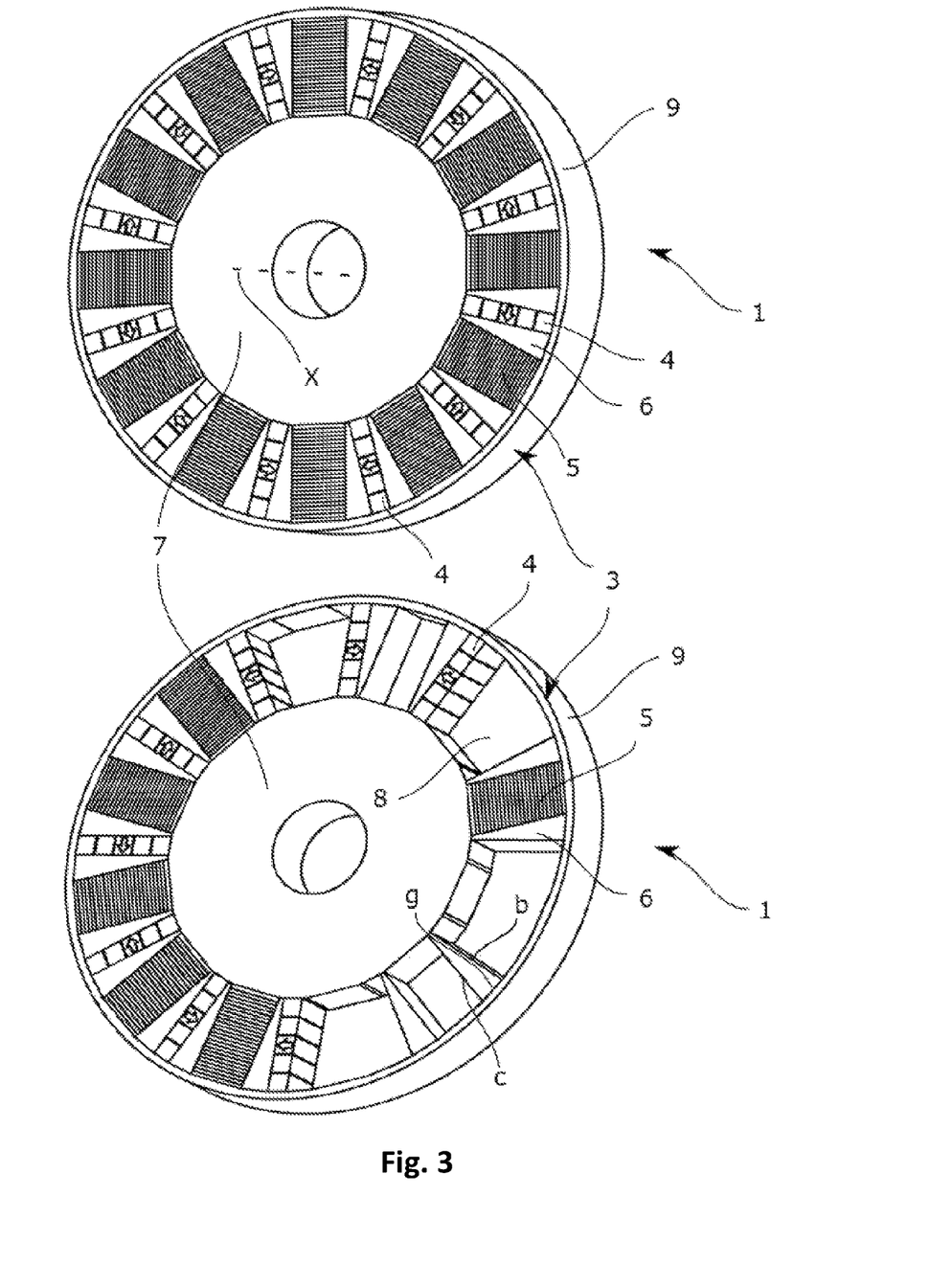
FIG. 3 shows the rotor according to the disclosure in a second possible embodiment in different views—at the top in a perspective view and at the bottom in a perspective view, wherein the rotor is only partially equipped with magnet elements, flux conduction elements and flux distributing elements.
Figure 4:
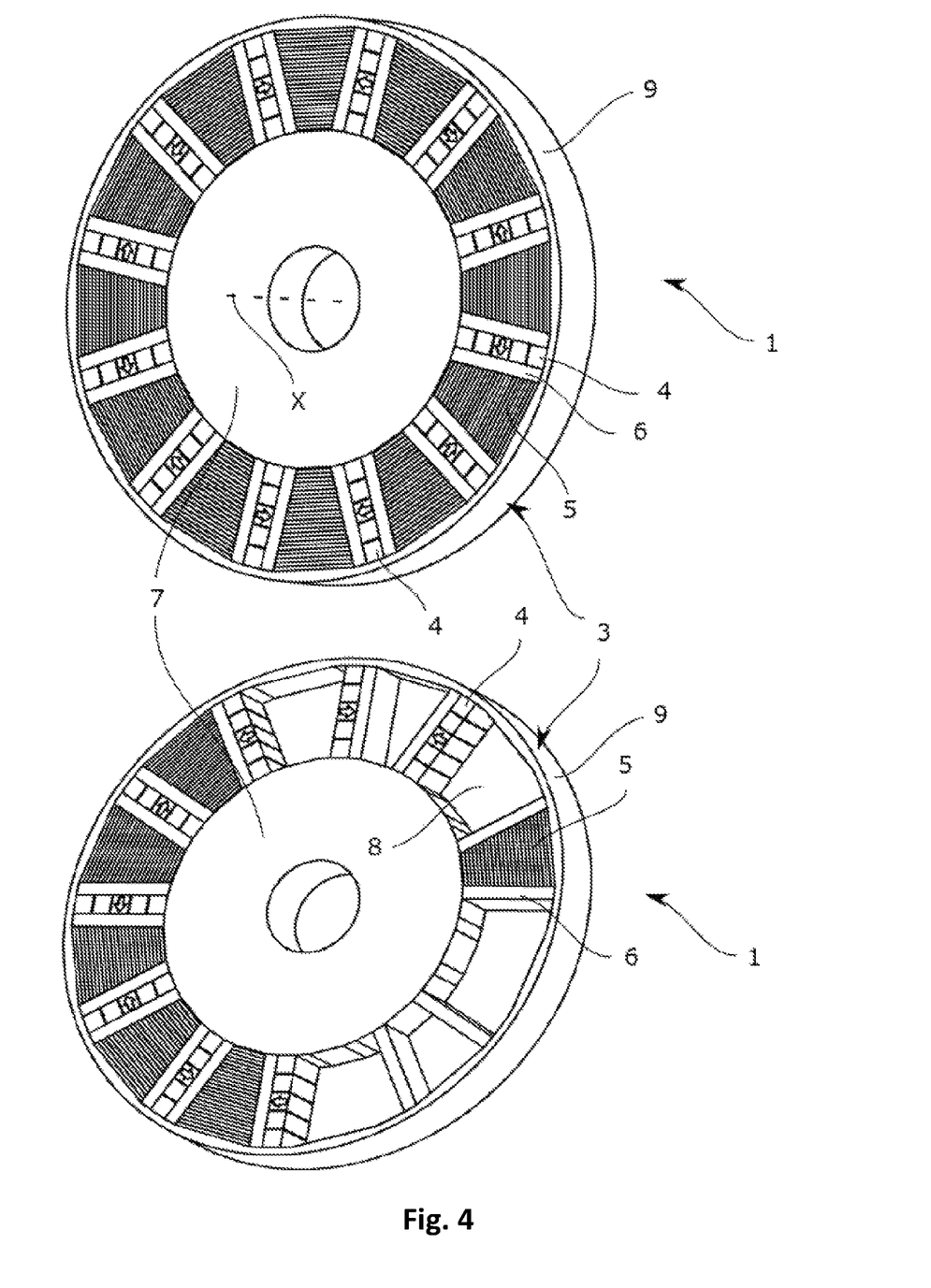
FIG. 4 shows the rotor according to the disclosure in a third possible embodiment in different views—at the top in a perspective view and at the bottom in a perspective view, wherein the rotor is only partially equipped with magnet elements, flux conduction elements and flux distributing elements.

In all embodiments shown, the rotor 1 is designed for an electrical axial flux machine 2 that can be operated as a motor and/or generator and comprises a support 3, a plurality of magnet elements 4 arranged in a pot-like receiving region of the support 3 and running radially from the interior outwards, and a plurality of flux conduction elements 5 which conduct the magnetic flux and are arranged in the receiving region of the support 3 and around the circumference between the magnet elements 4. Furthermore, a flux distributing element 6 which distributes the magnetic flux spatially and in particular in the radial direction is arranged between each of the magnet elements 4 and a flux conduction element 5 that is arranged adjacently thereto in the circumferential direction.

The sectional view in the top left in FIG. 2 clearly shows the structure of the support 3 with its pot-like receiving region for the magnet elements 4, the flux conduction elements 5 and the flux distributing elements 6. The support 3 substantially comprises a centrally arranged support hub 7, a support outer ring 9 arranged around the circumference, and a support disc 8 formed between the support hub 7 and the support outer ring 9 and forming the pot base of the support 3. Also shown is that the flux conduction elements 5 are formed as a lamination stack, wherein the sheets of the lamination stack have the same depth (width in the axial direction) over their entire radial extent. In the lower view of FIG. 2, it is also clearly visible that each of the essentially rod-shaped magnet elements 4 (as a single rod or made up of a plurality of similar individual magnets) running radially from the interior outwards is arranged in magnetically conductive contact on both sides around the circumference with a flux distributing element 6.

Here, the flux distributing elements 6 are designed to be essentially triangular in cross-section (as seen in a sectional plane perpendicular to the rotor rotation axis or in plan view of the side of the rotor 1 facing the stator 10), wherein the corners formed at acute angles are cut off and have a predetermined thickness. In the exemplary embodiment shown, the shape of the triangle is that of an obtuse-angled and preferably isosceles triangle. As seen in the circumferential direction, the flux distributing elements 6 have their long base side g in full contact with the associated magnet element 4 over its entire radial extent. With their triangle tip formed by the two remaining leg sides b, c, the flux distributing elements 6 project into the adjacent laminated stack of the respective adjacent flux conduction element 5, pointing away from the magnet element 4 arranged centrally between them in circumferentially opposite directions. In the embodiment shown, the flux distributing elements 6 enclosing a flux conduction element 5 therebetween are designed and arranged such that the sheets of the laminated stack of a flux conduction element 5 have an equal width extending tangentially to the circumferential direction from radially inside to the tip of the triangle of the flux distributing elements 6. The sheets arranged further radially outwards from the tip of the triangle become wider and wider.

In a further development of this embodiment, which is not shown, the flux distributing elements 6 can be designed in such a way that the leg of the triangle pointing radially outwards from the tip of the triangle is designed to be stepped or is replaced by a kind of stepped section with at least one step. This allows the number of sheets with different widths to be further reduced compared to the design without steps.

FIG. 3 shows the rotor 1 according to the disclosure in a second possible embodiment in different views. In the view at the top, the rotor 1 is shown fully equipped in a perspective view. In the view at the bottom, the rotor 1 is also shown in a perspective view, wherein here the rotor 1 is only partially equipped with magnet elements, flux conduction elements and flux distributing elements.

In contrast to the embodiment according to FIG. 2, the flux distributing elements 6 arranged between the magnet elements 4 and the flux conduction elements 5 are designed as acute-angled triangles as seen in cross-section, wherein the corners formed at acute angles are cut off and have a predetermined thickness. The triangle shape can be that of an acute-angled triangle, in particular an isosceles triangle (with cutoff acute-angled triangle tips), wherein the flux distributing elements 6 rest with their short base side g from the inside against the support outer ring 9 and extend radially inwards with their acute-angled triangle tip formed by the two remaining leg sides b, c and rest against an adjacent magnet element 4 or an adjacent flux conduction element 5. According to the embodiment shown, the flux conduction elements 5 with their laminated stacks are designed to be constant both in their width in the "circumferential direction" (or in their width extending tangentially to the circumferential direction) over their entire radial extent and in their axial depth (or width in the axial direction).

FIG. 4 shows the rotor 1 according to the disclosure, analogous to the representations in FIGS. 2 and 3, in a third possible embodiment in different views. In the top view, the rotor 1 is again shown fully equipped in a perspective view, while in the view at the bottom it is only partially equipped with magnet elements 4, flux conduction elements 5 and flux distributing elements 6 in a perspective view.

In contrast to the embodiments according to FIG. 2 and FIG. 3, the flux distributing elements 6 arranged between the magnet elements 4 and the flux conduction elements 5 have a rectangular cross-sectional shape. According to the embodiment shown, the sheets of the laminated stacks of the flux conduction elements 5 have a width that increases in the radial direction from the inside to the outside, while their axial depth is constant or they are formed with the same width in the axial direction.

All embodiments of FIGS. 2-4 also have in common that the support hub 7 has a polygonal cross-sectional shape on its radial outer ring surface and/or the support outer ring 9 has a polygonal cross-sectional shape on its radial inner ring surface.

The disclosure is not limited to the embodiments shown in the figures. The above description should therefore be regarded as explanatory rather than restrictive. The following claims are to be understood as meaning that a named feature is present in at least one embodiment of the disclosure. This does not preclude the presence of other features. If the patent claims and the above description define "first" and "second" features, this designation serves to distinguish between two features of the same type without defining an order of precedence.

LIST OF REFERENCE SYMBOLS

1 Rotor
2 Axial flux machine
3 Support
4 Magnet element
5 Flux conduction element
6 Flux distributing element
7 Support hub
8 Support disc
9 Support outer ring
g Base side of triangle (of the flux distributing element with a triangular cross-section)
a, b Leg side of triangle (of the flux distributing element with a triangular cross-section)
X Rotor rotation axis

The invention claimed is:

1. A rotor for an electrical axial flux machine that is operable as at least one of a motor or generator, said rotor comprising:
a support;
a plurality of magnet elements arranged against, on, or in the support and running substantially radially from an interior of the support outwards, the magnet elements being magnetized in a circumferential direction and being arranged individually or in groups in series around a circumference of the support with alternating opposing magnetization directions;
a plurality of flux conduction elements which conduct magnetic flux and are arranged against, on, or in the support and around the circumference, between the magnet elements; and
a flux distributing element which distributes the magnetic flux with soft magnetic composite material is arranged between at least one of the magnet elements and one said flux conduction element that is arranged adjacently thereto in the circumferential direction;
wherein the flux distributing element has a triangular cross-section as seen in a sectional plane perpendicular to a rotor rotation axis, the triangular cross-section rests with a base side thereof against an adjacent one of the magnet element, and is in contact with adjacently arranged ones of the flux conduction elements with two remaining leg sides of the triangular cross-section.

2. The rotor according to claim 1, wherein the flux distributing element has a same axial depth over an entire radial extent.

3. The rotor according to claim 1, wherein the flux distributing element is formed of soft magnetic composite material or of ferrite material.

4. The rotor according to claim 1, wherein at least one of the flux conduction elements is formed of laminated sheets.

5. The rotor according to claim 1, wherein the magnet elements comprise permanent magnets and are formed from a plurality of individual magnets electrically insulated from one another.

6. The rotor according to claim 1, wherein the support has an annular support hub, an annular support disc and a support outer ring delimiting the support radially outwardly, and an annular pot-shaped receiving region with a pot base formed by the support disc is formed between the support hub and the support outer ring for receiving the magnet elements, the flux conduction elements and the flux distributing element.

7. The rotor according to claim 6, wherein the support hub has a polygonal cross-sectional shape on a radial outer ring thereof.

8. A method for producing a rotor for an electrical axial flux machine that is operable as at least one of a motor or generator, comprising the following method steps:
providing a support;
providing magnet elements and introducing the magnet elements against, on, or in the support;
providing flux conduction elements and introducing the flux conduction elements against, on, or in the support; and
providing flux distributing elements and introducing the flux distributing elements against, on, or in the support;
wherein the flux distributing elements have a triangular cross-section as seen in a sectional plane perpendicular to a rotor rotation axis, the triangular cross-section rests with a base side thereof against an adjacent one of the magnet element, and is in contact with adjacently arranged ones of the flux conduction elements with two remaining leg sides of the triangular cross-section.

9. An axial flux machine, comprising: a stator and the rotor according to claim 1.

10. The rotor according to claim 4, wherein the at least one of the flux conduction elements is formed of laminated sheets is formed from electrical sheet, and has a same axial depth over an entire radial extent.

11. The rotor according to claim 5, wherein the individual magnets have a same axial depth over an entire radial extent.

12. The rotor according to claim 6, wherein the support outer ring has a polygonal cross-sectional shape on a radial inner ring surface thereof.

13. A rotor for an electrical axial flux machine that is operable as at least one of a motor or generator, said rotor comprising:
  a support;
  a plurality of magnet elements arranged against, on, or in the support and running substantially radially from an interior of the support outwards, the magnet elements being magnetized in a circumferential direction and being arranged individually or in groups in series around a circumference of the support with alternating opposing magnetization directions;
  a plurality of flux conduction elements which conduct magnetic flux and are arranged against, on, or in the support and around the circumference, between the magnet elements; and
  a plurality of flux distributing elements which distribute the magnetic flux with soft magnetic composite material, wherein one of the plurality of flux distributing elements is arranged between at least one of the magnet elements and one said flux conduction element and arranged adjacently thereto in the circumferential direction;
  wherein each said flux distributing element has a triangular cross-section as seen in a sectional plane perpendicular to a rotor rotation axis, each said triangular cross-section rests with a short base side thereof against a support outer ring of the support, and rests with one remaining leg side thereof against one of the magnet elements and rests with an other remaining leg side thereof against an adjacently arranged one of the flux conduction elements.

* * * * *